Nov. 26, 1946.   C. H. ZIMMERMAN   2,411,770
CONTROL COLUMN FOR PRONE POSITIONED PILOTS
Filed Sept. 12, 1944    5 Sheets-Sheet 1

INVENTOR.
Charles H. Zimmerman
BY
M. B. Tasker
ATTORNEY

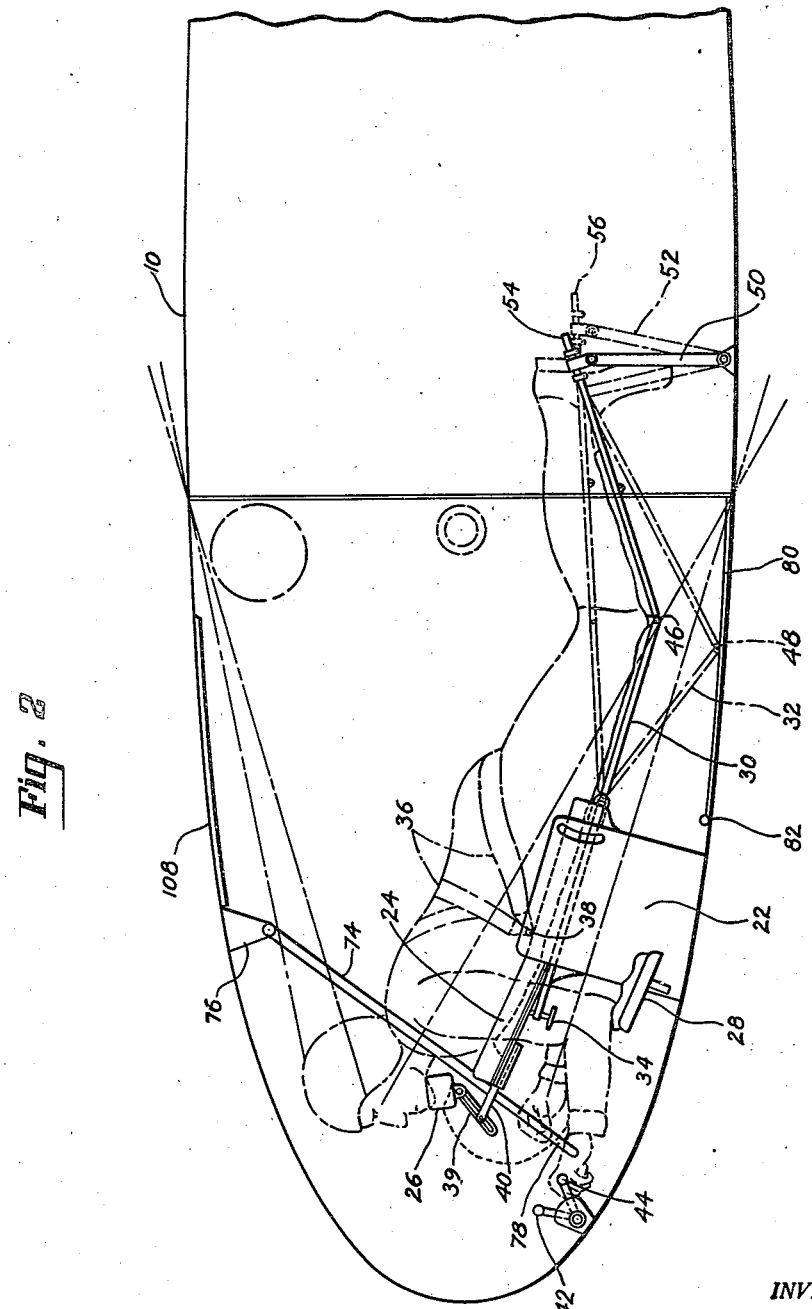

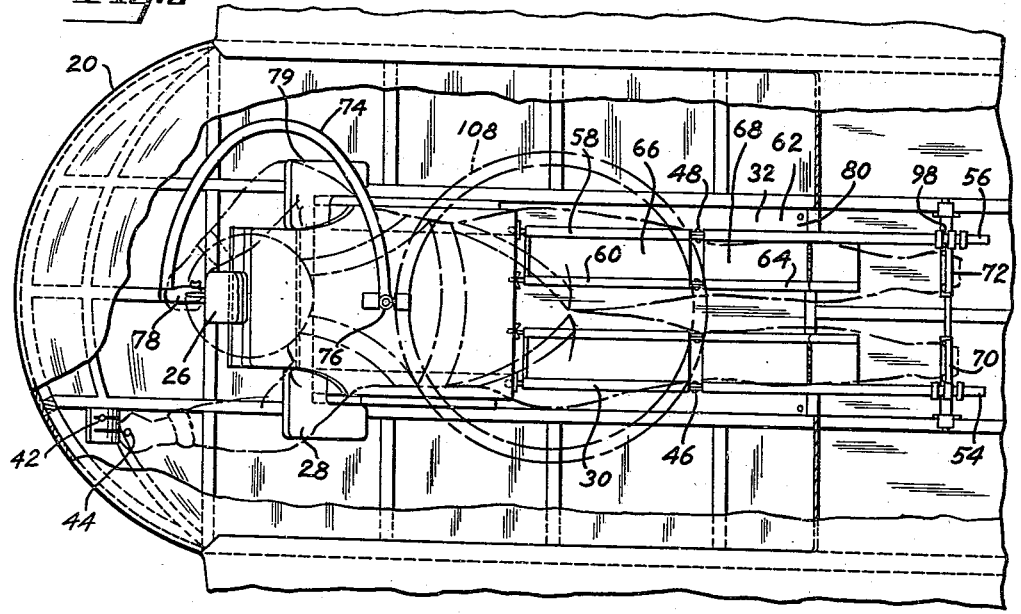
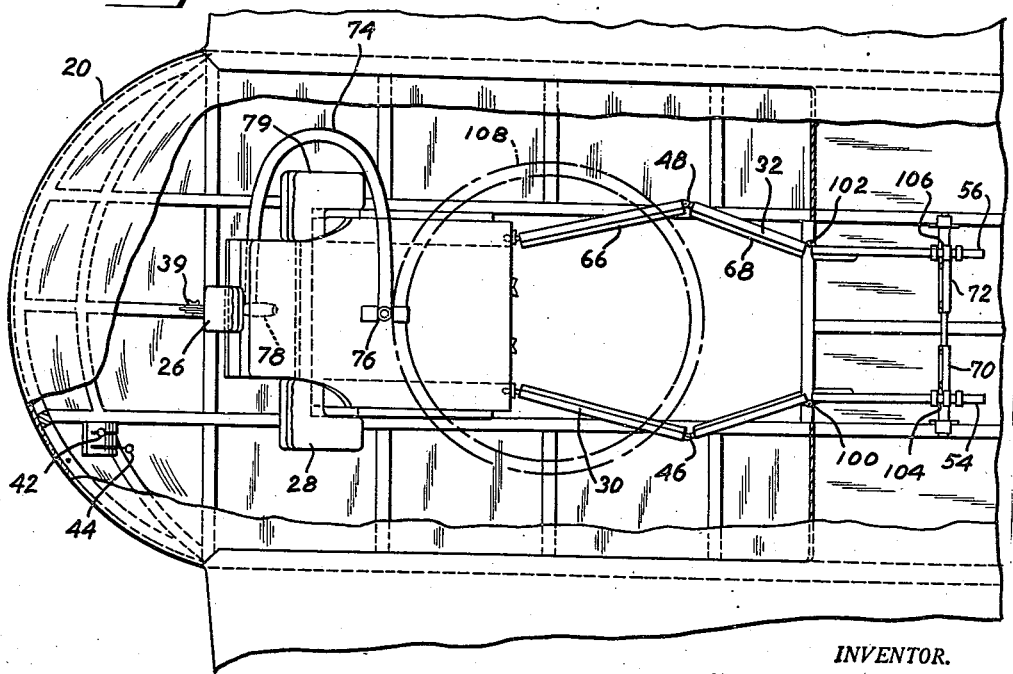
INVENTOR.
Charles H. Zimmerman

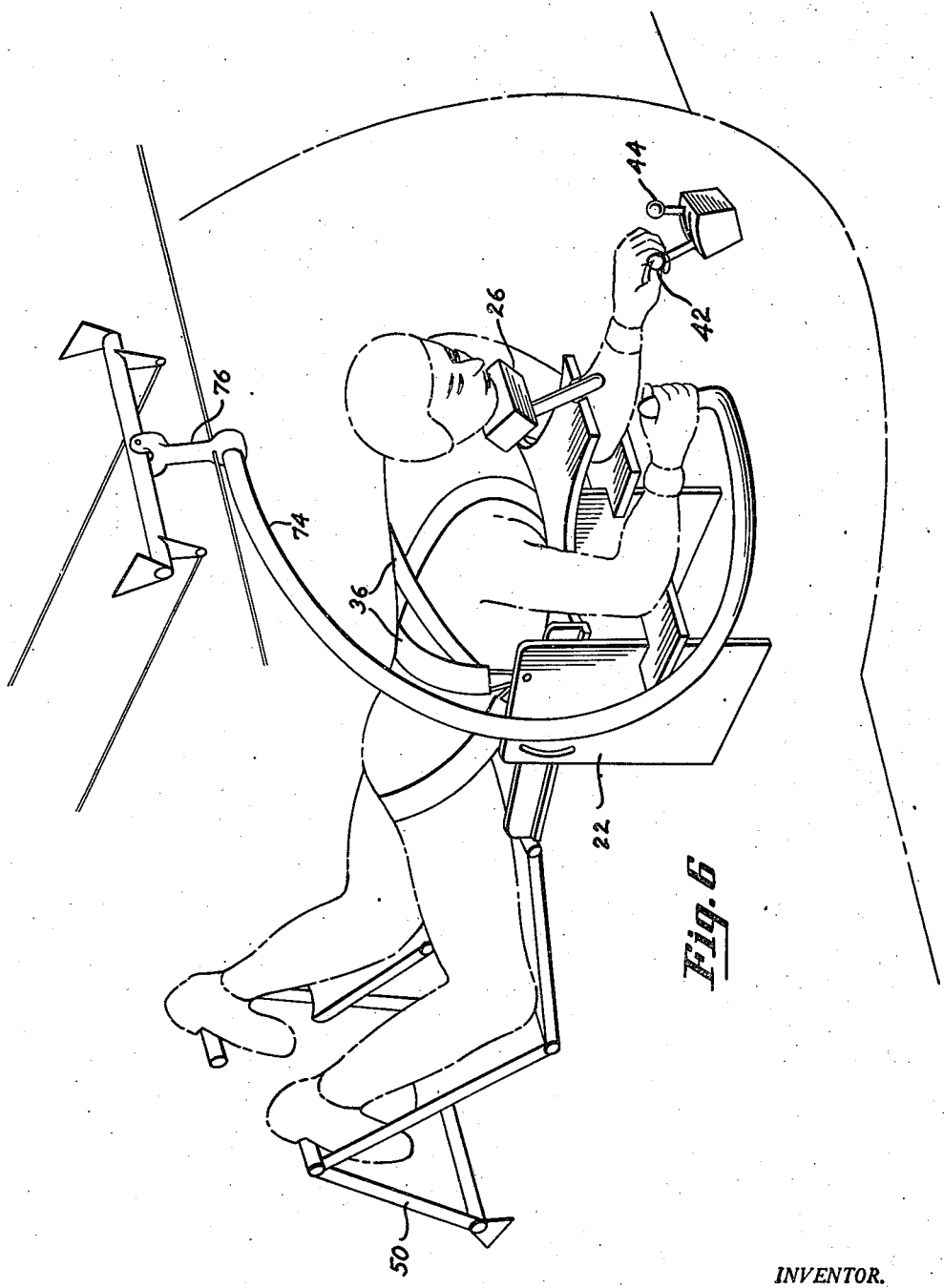

Patented Nov. 26, 1946

2,411,770

UNITED STATES PATENT OFFICE 2,411,770

CONTROL COLUMN FOR PRONE POSITIONED PILOTS

Charles H. Zimmerman, Nichols, Conn., assignor to United Aircraft Corporation, East Hartford, Conn., a corporation of Delaware Application September 12, 1944, Serial No. 553,727

4 Claims. (Cl. 244—83)

This application is a continuation-in-part of my copending United States application Serial No. 415,159, filed October 16, 1941.

This invention relates to improvements in airplanes and has particular reference to an improved pilot compartment and control apparatus for an airplane of a type which permits the pilot to assume a prone position in the pilot's compartment.

An object of the invention resides in the provision of an improved pilot's compartment and control apparatus of the character indicated which will permit the pilot to remain comfortably in a prone position while flying the airplane.

A further object resides in the provision of a pilot's compartment and control apparatus of the character indicated including features of adjustment by means of which the pilot supporting elements can be adjusted to comfortably support pilots of various weights and sizes.

A still further object resides in the provision of a pilot's compartment and control apparatus of the character indicated in which a portion of the control apparatus can be moved to provide an opening for convenient entry and exit of the pilot to and from the compartment and may be conveniently connected in operative position after the pilot is in the pilot's compartment.

Other objects and advantages will be more particularly pointed out hereinafter or will become apparent as the description proceeds.

In the accompanying drawings, in which like reference numerals are used to designate similar parts throughout, there is shown a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings:

Fig. 2 is a view on an enlarged scale of a fragmentary portion of the airplane shown in Fig. 1 showing in greater detail the position of the pilot in the pilot's compartment of such an airplane and the arrangement of the pilot supporting and airplane control elements.

Fig. 3 is a top plan view of the portion of the airplane shown in Fig. 2 also showing the pilot supporting and airplane controlling elements.

Fig. 5 is a plan view similar to Fig. 3 but also showing the position of the pilot's supporting and airplane control elements when the pilot enters or leaves the pilot's compartment, and Fig. 6 is a perspective view showing the pilot supporting and airplane control elements on an enlarged scale.

Figure 1:
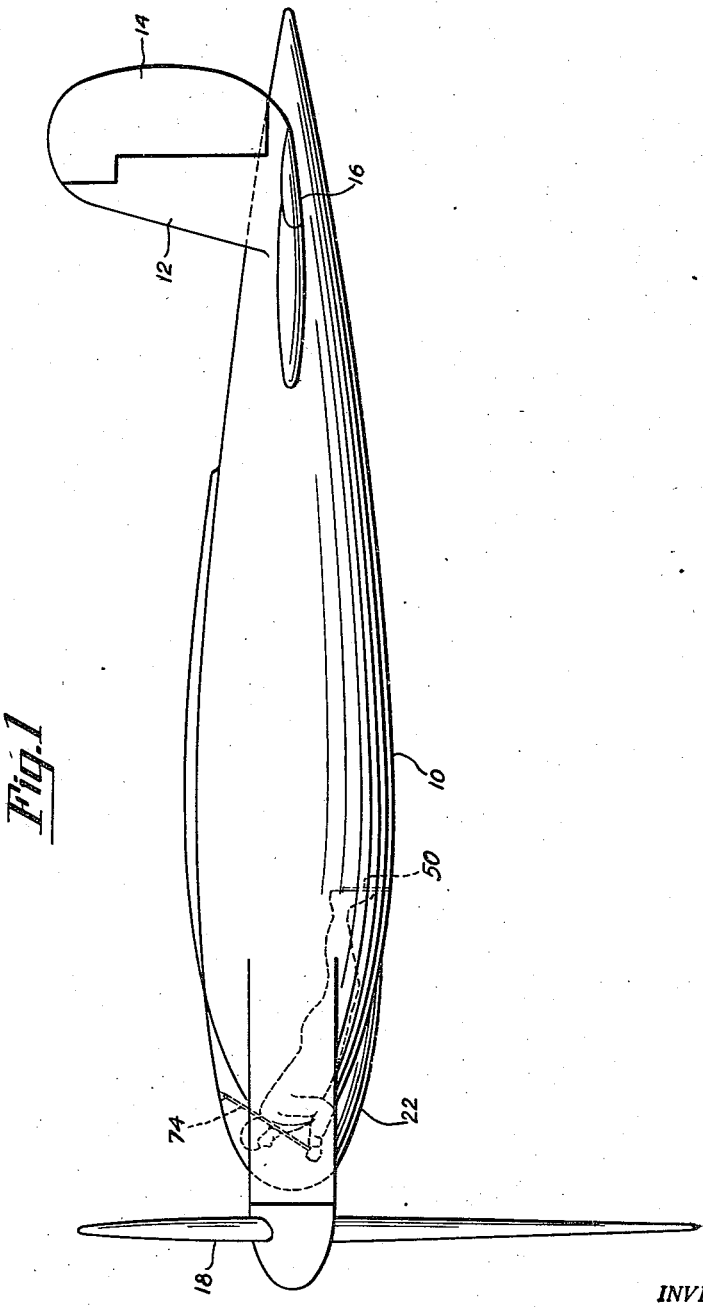
Fig. 1 is a side-elevational view of an airplane of the character referred to showing in dotted outlines the position of the pilot in the pilot's compartment of such an airplane.

Referring to the drawings in detail, in Fig. 1 there is illustrated an airplane of the type referred to, that is, a low aspect ratio monoplane having in the main wing portion thereof one or more engine compartments and a compartment for the pilot. In order that the airplane may have a minimum drag effect, all extensions and protuberances on the main wing contour are eliminated insofar as possible. As the main wing has not sufficient thickness to permit the pilot to occupy the normal sitting position, the pilot's compartment and the airplane controls have been so arranged that the pilot may occupy a prone position within the depth of the main wing portion of the aircraft. This arrangement provides an aircraft in which the only elements extending beyond the contour of the main wing 10 are the stabilizing fins, one of which is indicated at 12, the rudders, one of which is indicated at 14, and the combined stabilizer, elevator and aileron elements, one of which is indicated at 16, and the propellers, one of which is indicated at 18. The pilot's compartment occupies the forward center portion of the main wing 10 and is provided with a transparent front portion which may be in the form of a small dome 20, particularly shown in Figs. 3 and 5, extending slightly ahead of the leading edge of the main wing. This forward extension does not add materially to the drag of the airplane since it does not increase the thickness of the main wing portion or materially effect the contour thereof.

The pilot's support comprises a main base or pedestal element 22 carried upon the lower surface of the pilot's compartment at approximately the mid-length thereof; a pivoted forward extension 24, a chin rest 26, an arm rest 28 and a pair of leg rests 30 and 32 extending rearwardly from the pedestal 22.

The forward extension 24 is preferably pivoted at its rearward end to the pedestal 22 and is adjustable about this pivot by suitable means such the manually adjustable screw shaft 34. This member and the top of the pedestal 22 are preferably formed to receive a chest worn parachute pack which will serve as a cushion for the pilot's body when the pilot is in position on the support. The parachute strap, as indicated at 36 may also be utilized as the pilot's positioning and safety belt by attaching the ends of these straps to the pedestal 22 by a suitable quick detachable connection as generally indicated at 38. The parachute pack may be supplemented by other cushions as may be found convenient or necessary for the pilot's comfort. The chin rest 26 is carried on the forward end of the front extension 24 by a pair of adjustable link members 39 and 40 which may be manually positioned to bring the chin rest to the most convenient and comfortable position for the particular pilot. The arm or elbow rest 28 is also carried upon the pedestal 22 and is likewise adjustable so that it just receives and supports the pilot's elbow in the proper position for the pilot to reach with his left hand the throttle and mixture control levers 42 and 44.

The leg supports 30 and 32 are pivotally connected at their forward ends to the rearward portion of the pedestal 22, are provided at their midlength portion with hinges, as indicated at 46 and 48, which are positioned approximately at the location of the pilot's knees when in position in the compartment, and are supported at their rearward ends upon the pivoted links as indicated at 50 and 52 respectively. The rearward ends of the leg support members 30 and 32 are connected with the airplane rudders by suitable means including the respective rods 54 and 56. The connection between the rearward ends of the members 30 and 32 and the rudders is a differential connection so arranged that when the rearward end of one member is moved forwardly the rearward end of the other member is moved rearwardly a similar amount and vice versa. The rearward ends of the leg rest members 30 and 32 are movable by changing the angular relation of the two portions of each member on opposite sides of the respective hinges 46 or 48.

As particularly shown in Fig. 3, each of these leg rests has a sufficient width to comfortably support the legs of the pilot and may conveniently comprise rod members on either side and a padded member between the side rod members of each leg rest. Thus the leg rest 32 may have the rod members 58 and 60 along the forward portion thereof and the rod members 62 and 64 along the rearward portion thereof, a padded member 66 being included between the forward rod members 58 and 60 and a padded member 68 being included between the rearward rod members 62 and 64. The leg rest 30 is similar to the rest 32, described above, in all respects. At its rearward end each leg rest is provided with a transverse bar as indicated at 70 for the rest 30 and at 72 for the rest 32 which bars are adapted to engage with the foot of the pilot.

With this arrangement, if the pilot desires to move the rod 54 rearwardly he will straighten his left leg thereby raising the hinge 46 when he raises the knee of that leg and simultaneously lengthening the member 30. At the same time the right leg will have to be bent to permit the hinge 48 to drop allowing the leg rest 32 to shorten so that the rod 56 may move forwardly as the rod 54 moves rearwardly. The direction of movement of the rods 54 and 56 may be reversed by straightening the right leg and further bending the left leg. When the rudder is in neutral both legs will be bent a slight amount in order to provide a comfortable and relaxed position for the lower part of the pilot's body.

Figure 4:
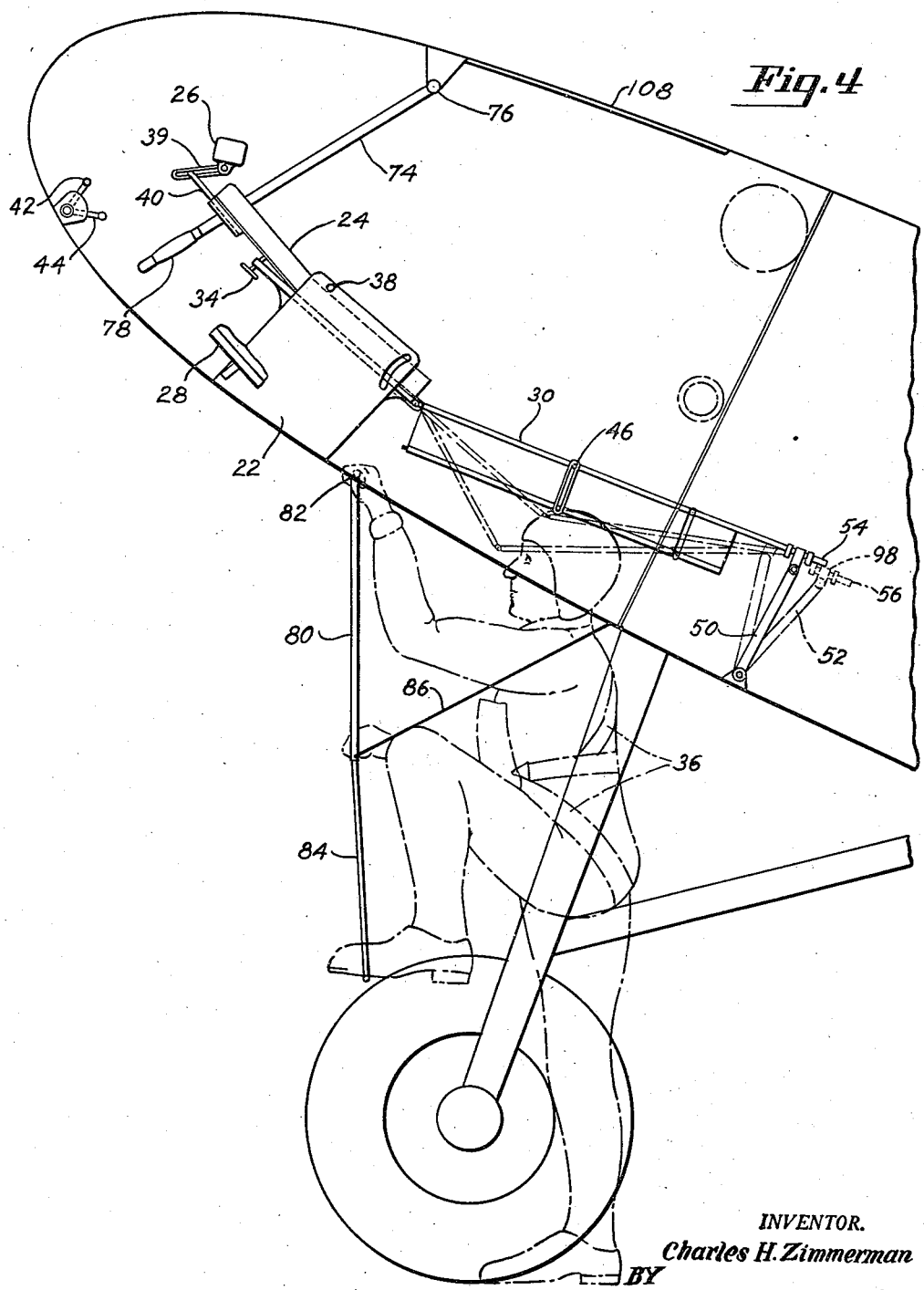
Fig. 4 is a side elevational view similar to Fig. 2 but showing the position of the pilot's supporting and airplane control elements when the pilot enters or leaves the pilot's compartment.

The control column 74 is hinged to the upper portion of the pilot's compartment at 76 where it is operatively connected with the linkage operating the elevator and aileron elements. This column is curved around the pilot, as is clearly shown in Figs. 3 and 4, and is brought to a position below the chin rest 26 where it is provided with a handle 78. By grasping the handle 78 with his right hand the pilot can move the handle in any direction over an area beneath the chin rest and forward extension 24 sufficient to provide complete control of the airplane. This control column, as is clearly shown, is curved to the right of the pilot so that it does not in any way interfere with the left hand operation of the throttle and fuel mixture control levers. An adjustable arm rest 79 is also provided for the pilot's right arm.

Immediately to the rear of the pedestal 22 there is provided a door 80 in the lower surface of the pilot's compartment. This door is hinged at its front end at 82 and swings downwardly, as particularly shown in Fig. 4, to provide an opening for the pilot to enter or leave the pilot's compartment. If desired, an extension 84 may be connected with the door to form a lower step for the pilot, as is particularly shown in Fig. 4, and this extension may be pivotally or slidably associated with the door in such a manner that it can be made to overlap the door when the door is in closed position. The limiting downward position of the door is determined by a tension member, such as the cable or link 86, to constitute the door and the extension a firm and safe means for ingress or egress of the pilot.

Since the leg rests 30 and 32 are immediately above the opening in the lower portion of the pilot's compartment provided by the door 80 it is necessary to make these members movable in order that the pilot may enter or leave the pilot's compartment. With this purpose in view, the rod member 60 is provided at its forward end with a hook which engages with a slidable pin carried by the pedestal 22 so that the forward end of this member can be disengaged from the pedestal thereby permitting the inner edge of the leg rest to swing downwardly about a swivel connection between the rod 58 and the pedestal 22 until the leg rest assumes a substantially vertical edgewise position. A swivel connection 98 is also provided between the rod 62 and the link 52 to permit this movement of the leg rest. The other or left hand leg rest is provided with similar connections and may also be freed to swing downwardly to a vertical edgewise position. After the two leg rests have been brought to their vertical position they will assume the position particularly shown in Fig. 5 in which the hinge points 46 and 48 are far enough apart to permit the pilot to enter or leave the compartment between the two leg rests. If desired, additional hinges may be provided in the leg rests, an indicated at 100 and 102 respectively, to render these elements even more flexible, and lost motion connections, as indicated at 104 and 106, may be provided between the rearward ends of these members and the respective supporting links 50 and 52 to permit the members to be moved a greater distance away from the center line of the pilot's compartment to enlarge the space through which the pilot may enter or leave the compartment.

After the pilot has entered the compartment the leg rests may be swung to their operative positions and the hooks secured on the respective pins, then, as the pilot's legs take their position on the leg rest and his feet contact the rudder pedals 70 and 72 these pedals will be brought to the rearward ends of the lost motion connections 104 and 106 and the leg rests will be bent the proper amount to insure the comfort and convenience of the pilot.

In addition to the door 80 in the undersurface of the pilot's compartment an emergency exit opening 108 may be provided in the upper surface through which the pilot may leave the compartment in the event it becomes necessary for him to abandon the airplane while in flight.

While a suitable mechanical embodiment for the purpose of disclosing the invention has been hereinabove described and illustrated in the accompanying drawings, it is to be understood that the invention is not limited to the particular arrangement so illustrated and described, but that various changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A control stick for an airplane having a pilot's compartment including top and bottom wall portions and pilot supporting means disposed longitudinally of and above the bottom wall portion for supporting a pilot in a prone position in spaced relation above said bottom wall portion, said stick having one of its ends pivotally supported on said top wall portion above a pilot on said supporting means for movement about two horizontal axes and extending generally transversely to said pilot supporting means and around one side of the latter toward said bottom wall portion and terminating beneath a pilot on said supporting means.

2. A control stick for an airplane having a pilot's compartment including top and bottom wall portions and pilot supporting means disposed longitudinally of and above the bottom wall portion for supporting a pilot in a prone position in spaced relation above said bottom wall portion, said stick having one of its ends pivotally supported on said top wall portion above a pilot on said supporting means for movement about two horizontal axes and extending generally transversely to said pilot supporting means and around one side of the latter toward said bottom wall portion and terminating below a pilot on said supporting means and beneath said pivotal support, said stick having at its free end an upstanding portion disposed on the opposite side of the pilot from said pivotal support and adapted to be grasped by a pilot on said supporting means.

3. A control stick for an airplane having a pilot's compartment including top and bottom wall portions and pilot supporting means disposed longitudinally of and above the bottom wall portion for supporting a pilot in a prone position in spaced relation above said bottom wall portion, said stick having one of its ends pivotally supported on said top wall portion directly above a pilot on said supporting means for movement about two horizontal axes and extending generally transversely to said pilot supporting means and around one side of the latter toward said bottom wall portion and terminating directly beneath a pilot on said supporting means, said stick having at its free end an upstanding handle portion adapted to be grasped by a pilot on said supporting means and which lies substantially in a straight line passed through the pivotal support for the upper end of said stick.

4. A control stick for an airplane having a pilot's compartment including top and bottom wall portions, and pilot supporting means disposed above the bottom wall portion for supporting a pilot in a prone position in spaced relation above said bottom wall portion, a control stick having one end pivotally supported on said top wall portion for movement about two horizontal axes, said stick extending downwardly and around one side of said supporting means and curved laterally and forwardly around a pilot positioned on the latter and terminating in an upstanding handle located below said supporting means in position to be grasped by a pilot supported thereon, said stick normally occupying a position such that both the intersection of said axes and the handle lie in a plane parallel to or identical with the plane of symmetry of the aircraft, whereby a force due to the pilot's leaning on the stick will have no tendency to inadvertently move the stick.

CHARLES H. ZIMMERMAN.